United States Patent Office 3,445,412
Patented May 20, 1969

3,445,412
ADHESIVE FOR BONDING POLYETHYLENE TO CROWN CAPS
Herbert W. Gerhardt, New Britain, and Conrad L. Lynch, Wethersfield, Conn., assignors to The Stanley Works, New Britain, Conn., a corporation of Connecticut
No Drawing. Filed Feb. 3, 1965, Ser. No. 430,183
Int. Cl. C08f *29/10;* C09j *3/14*
U.S. Cl. 260—23                                                6 Claims

ABSTRACT OF THE DISCLOSURE

An adhesive composition for securely bonding polyethylene film to a smooth surface metal substrate comprises at least 20 percent by weight of polyethylene having a molecular weight of less than 10,000, at least 10 percent by weight of a terpene resin having a melting point between about 100° C. and 135° C. and a molecular weight of about 1,200 and at least 10 percent by weight of a polymeric linseed drying oil. The adhesive produces a dry film which resists blocking and exhibits the ability of undergoing deformation without flaking or loss of adhesion.

---

The present invention relates to a method of adhering polyethylene and the like to a substrate. More specifically the invention relates to an improved process and composition for adhering polyethylene liners in crown type closures for bottled beverages and the like.

Crown closures have long utilized sealing liners made from both natural and composition cork. However, during the past decade or more the uncertainty of cork supply as well as the fluctuation in price and the necessity in many instances of preventing contact between the bottled beverage and the cork because of flavor transfer and spotty sealing defects have caused the crown cap industry to look for suitable materials as substitutes for cork. Modern synthetic materials have answered this need and liners made from plastic materials are now being employed. Generally thermoplastic materials of the "vinyl" type have experienced most success although some attempts have been made to utilize polyethylene liners. The later material is particularly desirable since it generally possesses all of the property requirements needed in the food packaging industry, particularly nontoxicity and inertness with respect to taste and odor transfer to the packaged product. Unfortunately, however, polyethylene generally exhibits poor adhesion to smooth surfaces or nonfibrous substrate materials due to its essentially nonpolar characteristics. Although attempts have been made at utilizing primers to adhere the polyethylene to these substrates, most of these primers have exhibited insufficient flexibility to withstand crown cap formation, i.e., loss of adhesion and flaking; and very low resistance to blocking, i.e., sticking of the treated plates or sheets when hot.

It is accordingly a primary object of the present invention to provide a composition which may be readily applied by standard coating techniques to sheets suitable for use in crown cap manufacture, which composition produces good adhesion between polyethylene and a nonporous substrate while possessing substantial resistance to blocking or sticking of the treated sheets when hot and the ability to undergo deformation without flaking or loss of adhesion.

Another object of the present invention is to provide a new and improved method of adhering measured quantities of polyethylene to crown caps so as to provide a bond of high sheer strength between the polyethylene and the crown cap.

A further cap object of the present invention is to provide an adhesive for securely bonding polyethylene to a crown cap, which adhesive is nontoxic, exhibits substantially no transfer of taste or odor, can be readily applied by roller coating to form a flexible and elastic covering which does not chip or crack due to changes in the shape of the substrate and can be quickly cured at elevated temperatures while substantially resisting blocking of the coated sheets when hot.

Other objects will be in part obvious and in part pointed out more in detail hereinafter.

The invention accordingly comprises the several steps and the relation of one or more of such steps with respect to each of the others and the article possessing the features, properties, and the relation of elements, which are exemplified in the following detailed disclosure, and the scope of the application of which will be indicated in the claims.

The above objects are accomplished in accordance with the present invention by employing an adhesive composition comprising a low molecular weight polyolefin, a polyterpene and an oxidizable fatty acid drying oil, all substantially uniformly dispersed in an inert nonaqueous solvent. For purposes of illustration and in order that the invention may be more clearly understood, the method and composition will be hereinafter described in accordance with its use for lining crown type closures with measured quantities of heated polyethylene.

Briefly the method of the present invention comprises the steps of applying by conventional coating techniques a nonblocking adhesive composition to metal sheets, such as lacquered tin plate sheets normally used in the crown cap industry; thermally curing the adhesive composition to drive off the inert carrier and form a solid solution matrix of the composition on the tin plate sheet; punching and forming crown caps from the coated tin plate so that the adhesive coating is on the inside of the cap; depositing measured quantities of molten or viscous polyethylene in the individual crown caps and subsequently molding the polyethylene into liners. Advantageously this process does not require that the crown cap be heated before deposition of the molten polyethylene, as disclosed in United States Patent No. 3,135,019, since the liner may be securely adhered to the cap by activation of the adhesive composition either during or subsequent to the molding of the polyethylene liner.

The substrate or sheet to which the adhesive composition is applied is generally a smooth surfaced, nonfibrous, nonporous solid material such as a metal or metal-like sheet. More specifically, the material utilized is that which is preferred in the manufacture of crown caps, namely a mild steel sheet having a low carbon content and being coated on both sides thereof with a thin film of tin. Such sheets are generally categorized as "tin plate" and are preferably cold reduced plates having an electrolytic deposition of tin on the surfaces thereof. The tin plate normally is used in sheet form which may vary in size from about 14″ x 20″ to 35″ x 35″, since sheets of these sizes are most suitable to the punching and forming of the crown caps. These sheets may also be provided with lacquered or varnished finishes which not only provide the metal with a protective coating for preventing formation of rust and the like, but also facilitate the lithographic or other printing operations which are generally applied to the sheets prior to crown cap formation. These protective coatings are generally of a thermosetting nature and therefore are resistant to liquefaction subsequent to the curing thereof. Such resin coated sheets or plates are generally well known in the crown cap industry and may be used with advantage in the present invention.

As mentioned hereinbefore, the adhesive composition of the present invention consists essentially of a polyolefin, a polyterpene and an oxidizable drying oil, all dispersed in an inert nonaqueous solvent. The polyolefin component of the composition is generally a solid, olefinic resin having a medium density, a high melting point and a measurable viscosity at approximately 125° C. Such materials generally are low molecular weight polymers and copolymers of ethylene having a low or zero acid number, a ring and ball softening point in the range of 107° C. to 115° C., for example about 110° C., and a penetration hardness at room temperature (100 gram weight per 5 seconds) of about 0.10 to 1.3 millimeters. It has been found that higher molecular weight polyolefins, that is, materials possessing a molecular weight of greater than about 10,000, will not produce the desired dispersion and consequently will adversely affect the adhesive properties of the composition. The preferred materials are low molecular weight polyethylene, that is, material possessing molecular weights up to about 7,000 to 8,500, and preferably in the range of 1,000 to 3,000. These materials are generally available in solid pellet form of various sizes, such as the polyolefins sold under the name "Epolene."

Where desired, low molecular weight polyolefins having a crystalline structure may also be incorporated as part of the polyolefin component of the adhesive. For example, the crystalline polyolefin sold under the name "DQWA" has been advantageously utilized. Such resins have a molecular weight of about 2,500, a ring and ball melting point of about 130° C. and an acid number calculated to be about 35. When used, the crystalline polyolefins generally comprise less than half of the polyolefin component of the adhesive, best results having been obtained when the crystalline material constitutes about one third thereof.

The entire polyolefin component generally constitutes more than 20 percent of the nonvolatile composition. The preferred range is from about 25 to 65 percent by weight with best results being obtained from the higher end of this range, namely 40 to 60 percent by weight.

The polyterpene component of the present invention is a thermoplastic polymer of an unsaturated or olefinic terpene hydrocarbon which, when heated or dispersed in an inert solvent, provides an excellent dispersing medium for the polyolefin. The polyterpene is comprised essentially of polymers and copolymers of cyclic terpenes, such as the pinenes and particularly the bicyclic b-pinene. These polymers are generally solid materials which are inert to dilute acids and bases and possess an acid number of approximately zero. More specifically, it is preferred that the polyterpene have a relatively high melting point, that is, a melting point of greater than 100° C., for example about 125° C. to 135° C. or more, and a specific gravity between 0.98 and 1.00. A typical example of a material which may be used is the polyterpene "Piccolyte" having an average molecular weight of 1100-1200.

The polyterpene has been employed with satisfactory results in amounts as low as 10 percent by weight of the nonvolatile portion of the adhesive. The preferred range for such materials is, however, 15 to 45 percent by weight, with excellent results being observed at about 35 percent by weight. In this regard, it should be noted that, although satisfactory results have been obtained from compositions utilizing a polyolefin-polyterpene ratio of less than 1:1, it is generally preferred to employ the polyolefin in equal or greater amounts than the polyterpene to produce the desired adhesive properties.

The third component of the adhesive composition, as mentioned hereinbefore, is an oxidizable fatty acid drying oil which enhances the film forming properties of the composition while at the same time contributing to the adhesiveness and controlling the viscosity of the coating formulation. Generally such materials are polymeric compositions exhibiting an incompatibility for polyethylene. However, it is an advantage of the present invention that the polyterpene acts as a mutual solvent for the two incompatible materials, thereby smoothly assimilating both materials into the formulation and facilitating the formation of a solid solution thereof upon evaporation of the volatile inert organic solvents therefrom. Although various polymeric drying oils may be utilized, the polymers of linseed oil appear to contribute the most beneficial properties to the adhesive composition. Typical of such material are the "OKO" catalyzed homopolymers of linseed oil having an acid number of 1–3 and an average molecular weight of 2500 and the maleic anhydride adduct of linseed oil known as "Esskol" having 1–10 percent by weight of maleic anhydride and an average molecular weight of 1800. The linseed component may constitute as much as 50 percent of the total solid content of the adhesive composition. It has been found that at least 10 percent of the linseed component is necessary in order to give sufficient body to the solidified solution of the adhesive composition and preferably about 15 to 40 percent by weight is employed.

According to the present invention the nonvolatile components are dissolved in an inert organic solvent in any suitable manner such as by intimate mixing in a ball mill or by heating the mixture with rapid stirring. The solvent employed may be any of the common inert organic solvents; however, it is generally preferred to use organic petroleum fractions possessing relatively high boiling points and comprising aromatic components, particularly where heating of the mixture is needed to effectuate dispersion. Illustrative of the inert solvents which may be used to form the polyterpene solution are toluene, xylene, mineral oil, ethylene dichloride, monochloro benzene, ethylene glycol monoether, cyclohexanone, petroleum ether and the high boiling "Amsco-Solv" solvents. However, it will be appreciated that most common inert organic solvents may be employed as the volatile component of the adhesive since they function primarily as a carrier which permits coating of the adhesive on the tin plate, as mentioned hereinbefore.

Solvation of the various components within the inert solvent may be effectuated in a conventional manner with or without heating the solution. Generally, however, it is preferred to mix the polyterpene and polyolefin resins in a major portion of the volatile aromatic solvent and effectuate the solution thereof by slow mechanical intermixing such as a pebble mill. This initial solution may also include all or only a part of the polymerized linseed oil. When only a portion of the polymerized oil is initially admixed and subjected to grinding in a pebble mill, the remainder of the oil and any additional solvent may be added thereto together with small amounts of additives such as antioxidants, metal naphthenate driers and the like. The uniform dispersion or solution obtained thereby generally comprises a nonvolatile component of from 25 to 50 percent by weight and exhibits a viscosity of from 15 to 70 seconds through a No. 4 Ford Cup.

The adhesive thus formulated may then be coated on a lacquered tin plate sheet, as mentioned hereinbefore, by means of a conventional gelatin coating roller or other suitable means which applies a uniform coating of the material on the sheet. The coated sheets are placed in an oven at 300° F. for approximately ten minutes to cure the adhesive and drive off the volatile component thereof. The coating of adhesive thereupon exhibits a dry film weight greater than about 7 mg./4 sq. in., the operable range being approximately 10 to 30 milligrams per 4 square inches of surface covered and preferably about 20 to 25 milligrams per 4 square inches. The thermal or heat treatment is sufficient to drive off the volatile inert carrier or solvent and leave the thin coating of the composition on the tin plate sheet in the form of a solid solution matrix. During normal production operations the sheets are quickly removed after curing and are stacked for subsequent use in the crown cap punching and forming operations. It is essential that the heated adhesive composition be substantially free from blocking characteristics, that is, it will not cause adherence of the coated sheets to one another during the stacking operation while in a heated condition.

The coated tin plate sheets are then subjected to a punching and forming operation wherein a plurality of crown type caps are formed from each sheet in such a manner that the adhesive coating is on the inner surface of the cap. The punched caps may then be placed in a cap liner machine such as the apparatus disclosed in United States Patent No. 3,135,019 and molten gobs of viscous polyethylene deposited therein. It is an advantage of the present invention, however, that these caps need not be preheated before the deposition of the molten polyethylene since the adhesive coating of the present invention may be activated subsequent to the deposition of the liner material in the caps. For example, the heating may take place during the molding operation of the polyethylene liner in a manner well known in the art.

To determine the adhesive ability of the compositions a simple but effective test procedure was developed. After applying the composition to a lacquered tin plate sheet, crown caps were formed so that the adhesive was on the inside of the cap. A polyethylene liner of known thickness was then molded within the cap and after cooling to room temperature an attempt was made to separate the liner from the cap without causing rupture of the liner. If the liner cannot be removed intact the holding power of the adhesive is considered to be greater than the shear strength of a polyethylene film of that thickness. Adhesion greater than the shear strength of a 10 mil polyethylene film is generally preferred although strengths as low as that possessed by a 5 mil film are considered satisfactory.

In order that the invention may be more fully understood the following specific examples are given by way of illustration but without limitation on the practice of the invention. In each example unless otherwise specified the parts are given by weight.

Example I

In a two gallon mixing vessel was placed 1.38 lbs. of "Amsco H—SB," an aromatic solvent having an initial boiling point of about 355° F.; 1.70 lbs. of "Epolene N 12," a polyethylene having an average molecular weight of about 1500° and 2.59 lbs. of "Piccolyte," a polypinene having a melting point of 125° C. The mixture was heated to 200° F. for 15 to 20 minutes with constant agitation by means of a high speed stirrer. About 1.46 lbs. of solvent was then added and the heat and agitation continued for another 15 to 20 minutes. The mixture was subsequently cooled, transferred to a five gallon vessel and 2.43 lbs. of "OKO," a homopolymerized linseed oil, was added together with 14.35 lbs. of solvent and 41 grams of metal naphthenate drier. The resultant formulation was thoroughly mixed resulting in a composition having a nonvolatile content of 27.9 percent and a viscosity of 24 to 28 seconds on a No. 4 Ford Cup. The composition was applied to a lacquered tin plate panel with a gelatin roll coater and baked for about 7 minutes at 300° F. to 315° F. The adhesive composition gave a dry film weight of about 20 mg./4 sq. in.

Crown caps were then punched from the coated tin plate in such a manner that the adhesive was located on the inside of the caps. The forming operation produced no rupture or flaking in the coating. Gobs of molten low-density polyethylene were then deposited in the caps, molded into liners under heat and pressure, and the holding power of the adhesive was tested. Results of these tests showed that although the liner adhered to the cap it could easily be removed, exhibiting a holding power less than 5 mils.

Example II

A pebble mill was charged with 192 grams of "Epolene N 12" polyethylene and 96 grams of "DQWA" crystalline polyethylene. To this was added 272 grams of "Piccolyte" polypinene, 200 grams of "OKO" homopolymerized linseed oil and 460 grams of the volatile organic solvent used in Example I. This mixture was ground for 48 hours to a fineness of 5–6 North Standard units on a fineness of grind gauge, after which the mill was drained and washed with an additional 525 grams of solvent. The formula was completed with the addition of about 40 grams of calcium, cobalt and iron naphthenate driers and an antioxidant to give a composition having a nonvolatile content of about 43.8 percent and a No. 4 Ford Cup of 60 to 65 seconds.

When applied and tested as described hereinbefore, the composition exhibited no flaking or blocking and showed an adhesion of greater than 30 mils.

Example III

A pebble mill was charged with 140 grams of "Epolene N 12" polyethylene, 68 grams of "DQWA" crystalline polyethylene, 195 grams of "Piccolyte" polypinene, 45 grams of "OKO" homopolymerized linseed oil, 23 grams of "Esskol," a maleic anhydride adduct of linseed oil having 1–10 percent maleic anhydride and a molecular weight of about 1800, and 372 grams of an aromatic organic solvent having an initial boiling point of 362° F. This mixture was ground for 48 hours to fineness of 5–6 North Standard units after which the mill was drained and washed with 497 grams of solvent. After addition of driers and antioxidants the composition had a nonvolatile content of 35.5 percent and a viscosity of 20 to 25 seconds on a No. 4 Ford Cup.

This adhesive composition when applied and tested as described hereinbefore exhibited no flaking or blocking and showed adhesion of greater than 10 but less than 30 mils.

Example IV

A pebble mill was charged with 190 grams of "Epolene N 12" polyethylene, 100 grams of "DQWA" polyethylene, 73 grams of "Piccolyte" polypinene, 77 grams of "OKO" homopolymerized linseed oil, 36 grams of "Esskol," the maleic anhydride adduct of linseed oil and 372 grams of the volatile organic solvent of Example III. This mixture was ground for 48 hours to a fineness of 5–6 NS, after which the mill was drained and washed with 226 grams of solvent. Driers and an antioxidant were added to give a formulation having a nonvolatile content of 44.6 percent.

The adhesive composition, when applied and tested as described hereinbefore, exhibited no flaking or blocking and showed adhesion greater than 20 but less than 30 mils.

Example V

An adhesive composition was prepared by adding to a laboratory pebble mill 272 grams of "Piccolyte" polypinene, 192 grams of "Epolene N 12" polyethylene having a molecular weight of about 1500, 96 grams of "DQWA" crystalline polyethylene, 136 grams of "Esskol," a maleic anhydride adduct of linseed oil and 460 grams of organic solvent having a boiling point of 355° F. This mixture was ground for approximately two days to obtain a fineness of 5–6. The mill was then drained and the residue washed out with 410 grams of solvent. The formula was completed by adding 4 grams of Antioxidant B, 36 grams of driers, 200 grams of "OKO" homopolymerized linseed oil and an additional 355 grams of solvent. The completed adhesive formula had a nonvolatile content of 43.3 percent and a viscosity of 35 to 45 seconds on a No. 4 Ford Cup.

When applied to a lacquered tin plate and tested as described herein, the composition exhibited no flaking or blocking and showed an adhesion between 6 and 10 mils.

As will be readily apparent from the foregoing detailed specification and specific examples, the present invention provides an improved adhesive and method for securing polyethylene liners to crown type closure caps. Advantageously, the polyethylene adhesive provides the strong and durable holding power necessary to secure such liners yet at the same time is nontoxic and imparts no undesirable taste or odor to food products with which it comes in contact. Additionally, it may be readily coated in a facile manner and permits stacking of the coated sheets while hot due to its excellent nonblocking characteristics. Further, the improved method of the present invention provides a unique combination of coating and crown forming techniques whereby the adhesive coated crown caps readily accept and securely adhere the polyethylene liners.

We claim:

1. A nonaqueous adhesive resistant to blocking and adapted for uniform dispersion in a volatile organic solvent and for securely bonding polyethylene films to smooth surfaced substrates comprising a nonvolatile component including at least 20 percent by weight of a polyolefin consisting essentially of polyethylene having a molecular weight of less than 10,000, at least 10 percent by weight of a terpene resin having a melting point between about 100° C. and 135° C. and a molecular weight of about 1100-1200 and at least 10 percent by weight of a polymeric linseed drying oil having a molecular weight up to about 2500.

2. A uniform dispersion of the adhesive of claim 1 in a volatile organic solvent wherein the nonvolatile component comprises at least 25 percent by weight of the dispersion.

3. The nonaqueous adhesive of claim 1 wherein less than half of the polyethylene exhibits a crystalline structure, the crystalline polyethylene having a ring and ball melting point of about 130° C.

4. A nonaqueous adhesive resistant to blocking and adapted for uniform dispersion in a volatile organic solvent and for securely bonding polyethylene films to smooth surfaced metal substrates comprising a nonvolatile component including about 20 to 65 percent by weight of a polyethylene having a molecular weight less than 10,000, about 15 to 45 percent by weight of a terpene and resin having a melting point between 100° C. and 135° C. and about 10 to 50 percent by weight of a polymeric linseed drying oil having a molecular weight up to about 2500, said adhesive having a dry film weight greater than 15 mg./4 sq. in. and the ability to undergo deformation without flaking or loss of adhesion.

5. The nonaqueous adhesive of claim 4 wherein less than half of the polyethylene exhibits a crystalline structure and the adhesive has a dry film weight of 20 to 25 mg./4 sq. in., the crystalline polyethylene having a ring and ball melting point of about 130° C.

6. A uniform dispersion of the adhesive claim 4 in a volatile organic solvent wherein the adhesive includes a minor amount of driers and antioxidants and the nonvolatile component constitutes greater than 25 percent of the total weight of the dispersion.

References Cited

UNITED STATES PATENTS

| | | | |
|---|---|---|---|
| 2,984,342 | 5/1961 | Smith | 206—59 |
| 3,008,863 | 11/1961 | Morris et al. | 156—339 |
| 3,022,194 | 2/1962 | Vollmer | 117—75 |
| 3,183,144 | 5/1965 | Caviglia | 161—252 |
| 3,253,059 | 5/1966 | Vollmer | 260—897 |
| 3,303,954 | 2/1967 | Beaudet et al. | 215—39 |
| 3,341,626 | 9/1967 | Peterkin | 260—897 |

DONALD E. CZAJA, *Primary Examiner.*

R. A. WHITE, *Assistant Examiner.*

U.S. Cl. X.R.

156—334; 215—39; 260—33.6, 897